Oct. 14, 1958 — T. B. PHILIP — 2,856,096
SAFETY DEVICES
Filed Jan. 30, 1953 — 3 Sheets-Sheet 1

INVENTOR.
THOMAS BRUCE PHILIP
BY
HIS ATTORNEYS.

Oct. 14, 1958 T. B. PHILIP 2,856,096
SAFETY DEVICES
Filed Jan. 30, 1953 3 Sheets-Sheet 2
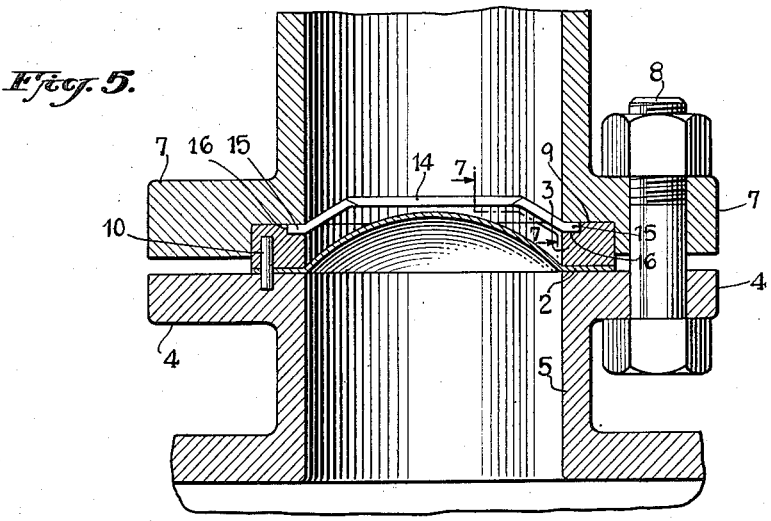
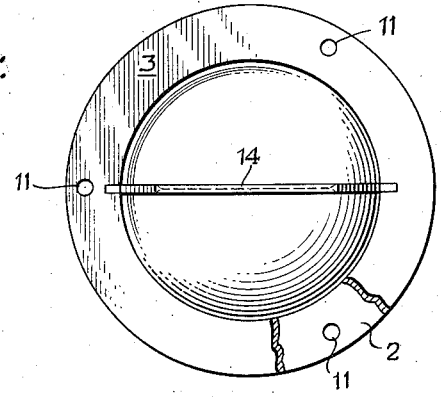
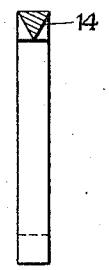
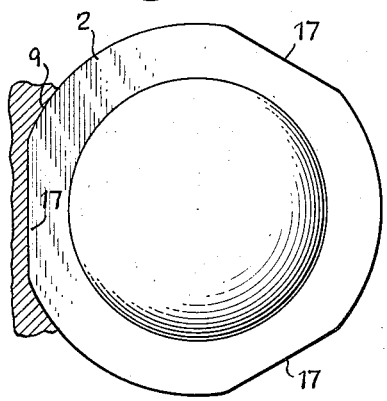
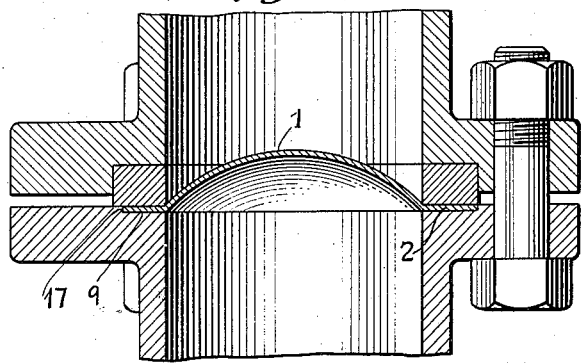
INVENTOR.
THOMAS BRUCE PHILIP.
BY Ward Crosby Neal
HIS ATTORNEYS.

Oct. 14, 1958 T. B. PHILIP 2,856,096
SAFETY DEVICES
Filed Jan. 30, 1953 3 Sheets-Sheet 3
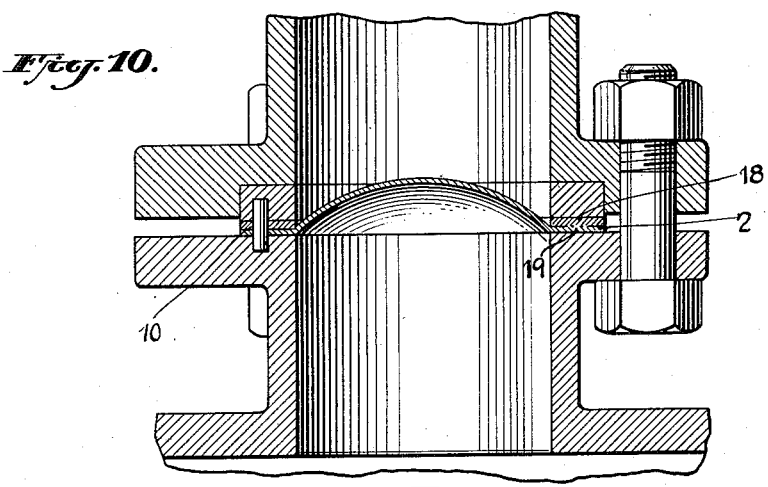
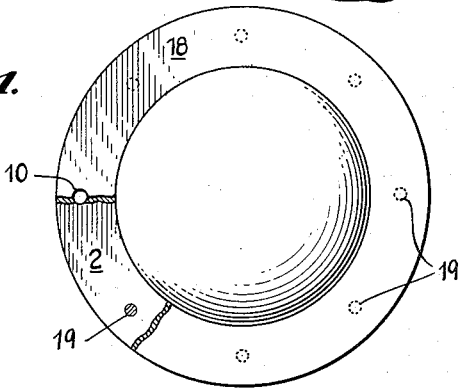
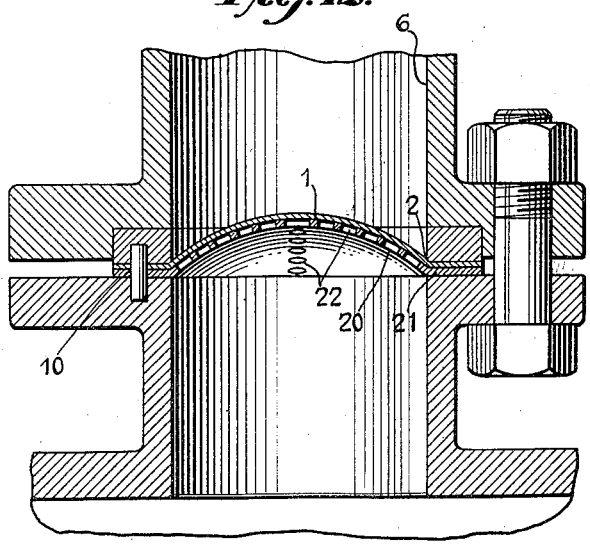
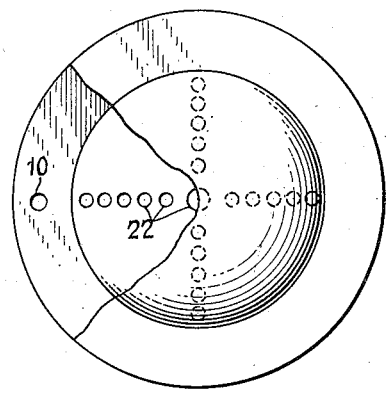
INVENTOR.
THOMAS BRUCE PHILIP.
BY
HIS ATTORNEYS.

2,856,096

SAFETY DEVICES

Thomas Bruce Philip, Effingham, England, assignor to The Distillers Company Limited, Edinburgh, Scotland, a British company Application January 30, 1953, Serial No. 334,187

Claims priority, application Great Britain February 8, 1952

1 Claim. (Cl. 220—89)

The present invention relates to safety devices for pressure vessels.

It is customary to fit pressure vessels, by which expression is meant sealed reaction or other types of vessels in which the fluid pressure therein may be or may become greater than that of surrounding atmosphere, with safety devices whereby the fluid content of the vessel may be released if the pressure of the fluid contents thereof increases beyond a certain limit. In this way the danger of explosions of pressure vessels due to excess pressures may be eliminated.

Among such safety devices which have been used are dome-shaped frangible diaphragms which are arranged in connection with the pressure vessel so that the concave side of the diaphragm is directly connected to the inside of the pressure vessel and on the convex side of the diaphragm there is a free path through which the fluid in the pressure vessel may escape should the diaphragm rupture.

The dome-shaped frangible diaphragms which have been chiefly used heretofore have each possessed an outwardly directed annular flange by means of which the diaphragm may be held in position in the body of the safety device so as to form an "air-tight" seal between the fluid in the pressure vessel and the outside atmosphere which will withstand positive pressure differentials up to a certain maximum value. By a positive pressure differential across the diaphragm we mean that the pressure on the concave side thereof is greater than the pressure on the convex side thereof, i. e. the pressure in the pressure vessel is greater than the pressure on the outer side of the diaphragm. When the positive pressure differential across the diaphragm increases beyond a certain maximum value, the diaphragm ruptures and thus provides an outlet for the fluid within the pressure vessel and the pressure therein is reduced.

Essentially the body of a safety device incorporating a frangible diaphragm comprises two portions between which the frangible diaphragm is located, the latter being held in position by a clamping action between these two portions of the safety device which act upon the annular flange of the frangible diaphragm. It is essential that the frangible diaphragm makes an "air-tight" seal within the safety device in this way, but it is obvious that in order to obtain this effect the clamping means within the safety device need not operate over the whole area of the annular flange of the frangible diaphragm. However, in practice it is generally most convenient to design safety devices in which the clamping means within the body of the safety device act on substantially the whole area of the annular flange of the frangible diaphragm.

When safety devices comprising frangible diaphragms are required to open and release the pressure within the pressure vessel at very low positive pressure differentials, the frangible diaphragms have to be manufactured from very thin and/or weak material in order to rupture as described above. Such weak frangible diaphragms are difficult to manufacture and handle and consequently in an alternative form of safety device a cutting edge or point is provided above the convex surface of the frangible diaphragm. The frangible diaphragms for such a device are so designed that, when subjected to the positive pressure differential at which it is desired that they should rupture, they will expand to such an extent that the convex surface thereof touches the cutting edge or point which pierces the diaphragm and causes the latter to rupture. These modified safety devices will hereinafter be referred to as "bursting-assisted safety devices."

In practice it has been customary to manufacture a series of frangible diaphragms which will fit in a one design safety device and which are so made as to rupture, if necessary by contact with a cutting edge or point, at different pressure differentials. In order, therefore, to make sure that any given pressure vessel is suitably protected from excess pressure, it is necessary to select the correct diaphragm which will rupture at a pressure differential below that at which the vessel might explode and above that which it is desired to maintain within the vessel. This mode of operation leads to a considerable source of danger in that it is very easy to confuse diaphragms which burst at different pressure differentials, since to the unskilled operative two frangible diaphragms which burst under completely different pressure differentials may appear superficially similar.

The object of the present invention is to provide a safety device of the type hereinbefore described in which the possibility of fitting an incorrect frangible diaphragm is considerably reduced. A further object of the present invention is to provide safety devices of the type hereinbefore described which have substantially the same shape and design but which contain small modifications whereby it is not possible to fit incorrect frangible diaphragms.

Another object of the present invention is to provide a diaphragm having characteristics to avoid improper insertion thereof in the safety device.

The invention accordingly consists of the novel apparatus and combinations thereof, specific embodiments of which are described herein by way of example only and in accordance with the manner in which I now prefer to practice the invention.

The present invention, accordingly, includes in a safety device of the kind described a pressure release conduit, a frangible diaphragm of special character arranged to sustain a differential pressure on its opposite faces and to rupture under a specified differential, and clamping means to hold the diaphragm in position in the conduit. With these members is combined an interrelating mating means between the diaphragm and conduit to permit only a diaphragm having such special characteristics mentioned above to be clamped in position. It also includes the diaphragm itself with its interrelated mating means.

Accordingly, the present invention provides a safety device of the type hereinbefore described comprising a dome-shaped frangible diaphragm bearing an outwardly directed annular flange, the diaphragm being held in position in the safety device by clamping means acting on the flange, characterised in that the body of the safety device and the annular flange of the frangible diaphragm bear interrelated mating means whereby only one design of frangible diaphragm may be held in position in the safety device.

The interrelated mating means between the annular flange of the frangible diaphragm and the body of the safety device may take any suitable form provided that frangible diaphragms, not having the interrelated mating means, will not fit in the body of the safety device between the clamping means and so cannot form an "air-tight" seal within the safety device between the fluid in the pressure vessel and the outer atmosphere. In this way explosions or premature rupture caused by the use of an incorrect frangible diaphragm will not be possible.

The interrelated mating means between the body of the safety device and the annular flange of the frangible diaphragm may be arranged between any part of the annular flange and the body of the safey device, but in practice it is preferred that the mating means should be arranged between the annular flange and that part of the body of the safety device which act as clamping means upon it.

The interrelated mating means may take the form of spaced peripheral indentations on the annular flange of the frangible diaphragm which fit round corresponding projections running between the two portions of the body of the safety device in such a way that only one diaphragm may be fitted between the clamping means of one design of safety device. A preferred embodiment of the present invention is to provide the annular flange with one or more perforations which fit on corresponding pegs running between the clamping means in the safety device.

It is preferred that the safety device according to the present invention should be of the type in which the frangible diaphragm is held in position by the downward action of a clamping ring. Safety devices, according to the present invention, of the above type are most suitably formed by inserting one or more pegs into that portion of the body of the safety device which supports the lower side of the annular flange of the frangible diaphragm and then making corresponding holes in that surface of the clamping ring which acts on the upper side of the annular flange of the diaphragm. In this type of safety device there there is only one corresponding clamping ring and one corresponding frangible diaphragm which will mate with the pins in the body of the safety device and consequently the correct frangible diaphragm may be chosen by correlating the perforations in the annular flange of the diaphragm with the holes in the clamping ring. Should it be desired to operate the safety device with a frangible diaphragm which ruptures at a different pressure differential, the disposition of the pegs in the body portion of the safety device may be rearranged to suit the perforations in the annular flange of the new diaphragm and a new clamping ring must be prepared to correspond to the new disposition of the pegs.

Frangible diaphragms which are designed to rupture under relatively low pressure differentials or for use in bursting assisted safety devices are in general manufactured from thin metal sheets and it has been found that the annular flanges of these diaphragms are so weak that they may be forced into safety devices with whose clamping means they do not in fact mate. It may further be possible to clamp these relatively weak diaphragms into position and form an "air-tight" seal with the result that the pressure device may be used but will not give relief of excess pressure at the pressure differential for which it was designed. To overcome this difficulty a further embodiment of the present invention provides the annular flange of a relatively weak frangible diaphragm with a reinforcing annular ring which fits and strengthens the annular flange and is such that the combined annular flange and annular ring mate with the clamping means in the safety device. The reinforcing annular ring is attached to the annular flange by any suitable means such as, for instance, an adhesive, rivets, bolts or spot welding. When rivets or bolts are used it is essential that they should not prevent the clamping means in the safety device from forming an "air-tight" seal with the diaphragm. This may be ensured by providing the clamping means with holes or recesses into which the ends of the rivets or bolts may fit thus allowing the clamping means to act directly on the strengthened annular flange. The rivets or bolts may be so disposed around the annular flange of the frangible diaphragm and the corresponding holes or recesses so disposed around the clamping means as to act as interrelated mating means according to the present invention. Alternatively, the strengthening ring may be attached to the annular flange of the frangible diaphragm by means of small rivets or bolts around the periphery of the annular flange and then the clamping means of the safety device may be arranged to act only on the inner portion of the strengthened annular flange.

In my copending United States application Ser. No. 332,727, filed January 22, 1953, now Patent No. 2,766,904, I describe new vacuum supports for use in collaboration with dome-shaped frangible diaphragms in safety devices. These vacuum supports may be used in collaboration with frangible diaphragms bearing mating means according to the present invention provided that, if the interrelated mating means are arranged between the clamping means acting on the annular flange of the frangible diaphragm and if the vacuum support is to be held in position in the safety device by the said clamping means, the annular flange of the vacuum support must bear mating means corresponding to those on the annular flange of the diaphragm. In the above mentioned copending application I disclose a modification in which the vacuum support and the frangible diaphragm both bearing outwardly directed annular flanges are attached to each other through said flanges so that the former protects the latter from damage which might occur as a result of rough handling, packing or fitting. The vacuum supports may be attached to frangible diaphragms bearing mating means according to the present invention provided that their annular flanges bear corresponding mating means. The annular flanges of vacuum supports attached in this way may serve to strengthen the annular flanges of relatively weak frangible diaphragms in place of the reinforcing annular ring hereinbefore mentioned.

When the safety device according to the present invention is of the bursting-assisted type as hereinbefore described it has been found that it is particularly advantageous to attach the cutting edge or point to the clamping ring of the safety device. Hitherto bursting-assisted safety devices have suffered from the disadvantage that there has not been any suitable method whereby the distance between the cutting edge or point and the convex surface of the frangible diaphragm could be checked in order to ensure that the correctly shaped diaphragm had been employed. This disadvantage arose from the fact that the cutting edge or point was attached permanently to some position within the body of the safety device and therefore could not be easily inspected with the frangible diaphragm fixed in position. This disadvantage may be overcome in bursting-assisted safety devices according to the present invention if the cutting edge is attached to a clamping ring which bears interrelated mating means with the frangible diaphragm and the body of the safety device with which it is to be used.

In these bursting-assisted safety devices according to the present invention the correct frangible diaphragm may be chosen by correlating the mating means on the clamping ring with those on the frangible diaphragm. The correct diaphragm may then be placed in position against the clamping ring to which is attached the cutting edge or point and thus the distance between the convex surface of the diaphragm and the cutting edge or point may be accurately checked. The frangible diaphragm and the clamping ring may then be assembled in the body of the safety device thus producing a brusting-assisted safety device in which the distance between the convex surface of the frangible diaphragm and the cutting edge or points has been accurately checked. It should be noted that only one clamping ring and one frangible diaphragm will fit with the interrelated mating means in the body of the safety device and thus there is no possibility of an incorrect frangible diaphragm being fitted with an incorrect cutting edge or point within the bursting-assisted safety device.

In the accompanying drawings forming part of this application are shown embodiments of the apparatus of the invention as it is now preferred to practice it. In these drawings which are somewhat diagrammatic:

Figure 5 is a vertical section of a bursting-assisted safety device with a similar mating means to that shown in Figure 1.

Figure 6 is a plan view of the clamping ring showing attached thereto a bursting blade.

Figure 7 is a cross section of the bursting blade along the line 7—7 of Figure 5.

Figure 8 is a vertical cross section corresponding to Figure 1 in which the diaphragm is employed with truncated edges mating with similar edges in the pressure release conduit.

Figure 9 is a plan view of the diaphragm employed in Figure 8.

Figure 10 is a vertical section corresponding to Figure 1 showing the frangible diaphragm with a reinforced flange.

Figure 11 is a plan view of the diaphragm of Figure 10.

Figure 12 is a vertical section corresponding to Figure 1 and including a vacuum support and mating device, and Figure 13 is a plan view of the diaphragm and vacuum support.

Figure 1:
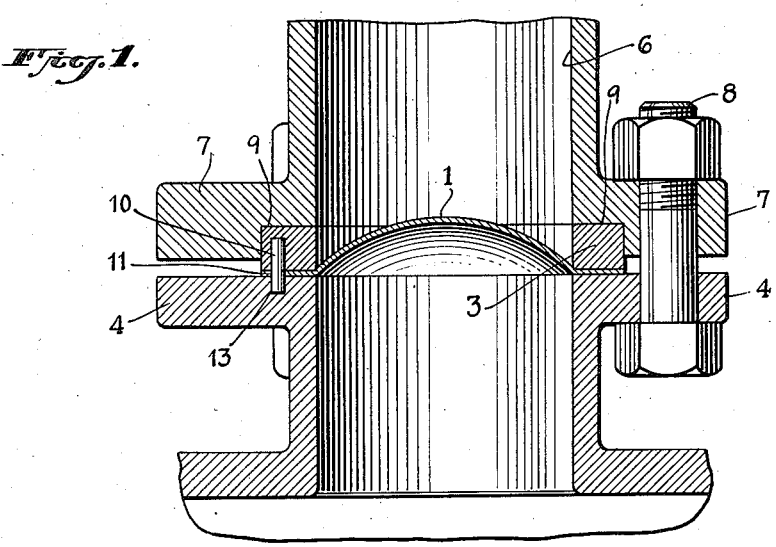
Figure 1 is a vertical section of a safety conduit with a frangible diaphragm therein showing one form of mating means.

Referring now to Figure 1 there is shown a frangible dome-shaped diaphragm 1 of metal or other material. The metals preferred are ductile metals such as nickel, silver, copper, certain types of stainless steel and other alloys. The diaphragm shown here is made of silver, has a maximum diameter of approximately 2 inches and will burst under a positive pressure differential of 450 p. s. i. if the thickness of the diaphragm is 0.01 inch. The diaphragm has an outwardly directed annular flange 2, such flange as shown being located in a plane substantially perpendicular to the vertical axis of the dome. The flanged dome is held in position within the pressure conduit by annular clamping ring 3 on the upper face of a flange forming part of a conduit 5 which is directly connected to the pressure vessel (not shown). Above the conduit 5 is placed an escape conduit 6 which is preferably open to the atmosphere. This escape conduit is provided with a flange 7 which, when the conduits 5 and 6 are aligned in position, is opposite the flange 4, the two being joined by suitable bolts 8. The annular clamping ring 3 is fitted in a recess 9 in the bottom face of the flange 7. 10 represents a peg which interfits or mates with an aperture 11 in the flange of the diaphragm 1. It also interfits a recess 12 in the lower face of the clamping ring 3 and interfits a recess 13 in the upper face of the flange 4.

Thus, the conduit has two separable mating sections 5 and 6 between which the frangible diaphragm is clamped and extends across and closes the conduit pipe. This diaphragm is one of a series, each having at least three annularly spaced apertures as shown more clearly in Figs. 2, 3 and 4, discussed below. These frangible diaphragms each have a different bursting pressure and are calibrated so that the diaphragm shown in Fig. 2, for example, has a bursting pressure that may be 450 p. s. i. That shown in Fig. 3 with four apertures would have an appreciably higher bursting pressure than that shown in Fig. 2. Fig. 4 with five apertures would have an appreciably higher bursting pressure than that of Fig. 3.

There are also at least three positioning pins 10 carried by the mating sections. Thus there would be three positioning pins corresponding to the apertures in Fig. 2. These pins are of a size and so placed that they will receive only the particular diaphragm intended therefor as controlled by the aperture in the diaphragm. Therefore, in Fig. 2 the diaphragm having 450 p. s. i. can only be fitted onto the pins corresponding thereto. It could not be fitted onto the pins required for the diaphragm in Fig. 3 or in Fig. 4. Therefore, there is no possibility of selecting a diaphragm bursting at a pressure other than 450 p. s. i. as long as the three apertures and pins interfit as required for the diaphragm of Fig. 2.

Figure 2:
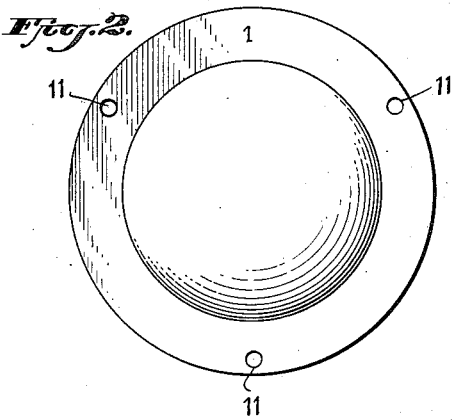
Figure 2 is a plan view of a frangible diaphragm corresponding to that shown in Figure 1 provided with three apertures in its annular flange.
Figure 3:
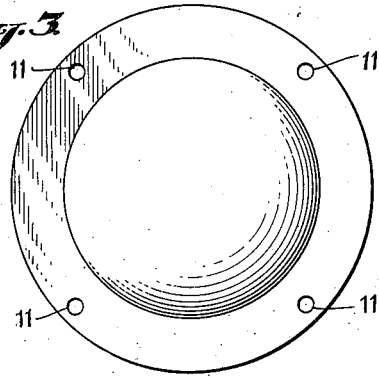
Figures 3 and 4 are modifications of the diaphragms shown in Figure 2.
Figure 4:
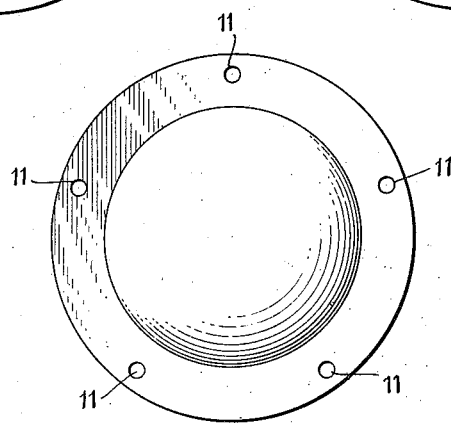

Instead of having one aperture 11 and one peg 10 interfitting as shown in Figure 1, the diaphragm may be modified to have several such apertures which interfit with corresponding pegs of different safety devices as shown in Figures 2, 3 and 4. In Figure 2 there are three of such apertures into which three pegs would fit and similarly there are four and five apertures respectively in the flanges of the diaphragms there shown in Figures 3 and 4.

In Figure 5 is shown a similar apparatus to that of Figure 1 and including a blade 14 as a bursting blade. This blade is provided with flanges 15 at each end which fit into and are attached to recesses 16 in the annular clamping ring 3 occupying part of the recess 9 provided for such ring. In operation when a positive pressure differential is applied to the frangible diaphragm sufficient to cause it to expand, it will expand and approach the cutting edge 14 and if the pressure is great enough, the edge will pierce the diaphragm which will then rupture and release the pressure in the vessel. This device including the bursting knife is similarly provided with a mating pin 10 in the same manner as shown in Figure 1.

In Figure 8 there is shown a similar apparatus to that of Figure 1 but instead of the mating device being a pin a frangible diaphragm 2 having equidistant spaced truncated sides 17 is employed. The truncated sides interfit with corresponding truncated sides in the recess 9 forming mating means interfitting the sections of the pressure release conduit and the diaphragm when assembled. If the parts do not mate, the diaphragm is rejected and cannot be fitted to form an "air-tight" seal within the safety device.

In Figure 10 an apparatus similar to that shown in Figure 1 is shown in which the flange 2 of the diaphragm is reinforced by a metal ring 18 which is spot welded as shown in Figure 11 to the top surface of the flange 2. The spot welds are designated 19.

In Figure 12 is shown an apparatus like that in Figure 1 with the vacuum dome added. Vacuum domes of this type are shown in my copending application Serial No. 332,727, filed January 22, 1953, now Patent No. 2,766,904. In Figure 12 the vacuum dome is designated 20 and substantially fits the frangible diaphragm 1 over the whole of its concave surface. The dome 20 is provided with a flange 21 at the edge thereof co-extensive with the flange 2 of the diaphragm. The vacuum support is provided with perforations 22 which are so disposed as to form two lines of potential rupture at right angles to one another crossing the vacuum support. These rupture lines are provided so that when the pressure inside the conduit 5 rises above the bursting pressure of the diaphragm 1 the diaphragm will burst and the vacuum support will rupture along the lines provided by the perforations 22. On the other hand when a reduction of pressure occurs in the conduit 5 below that of the atmosphere in 6, the vacuum support will prevent the diaphragm from being sucked downwardly and creased or otherwise distorted to change its critical bursting point.

In carrying out the process of selecting and assembling the diaphragm with the safety conduit a calibrated frangible flanged diaphragm is selected from a series, each having at least three annularly spaced apertures in the flanges. The calibrations are such that three apertures represent a particular bursting pressure. Four apertures represent a different bursting pressure and five apertures represent a still different bursting pressure. These apertures are fitted to at least three positioning pins carried by the two mating sections of the pressure release conduit. The number and placement of the pins conforms to the number and placement of the apertures so that the pins will receive only a particular diaphragm. After fitting the diaphragm over the pins the mating sections are clamped together.

I claim:

A process, wherein only the proper diaphragm may be fitted in a pressure release conduit which comprises selecting a calibrated frangible flanged diaphragm from a series thereof, each having at least three apertures in the flanges arranged so as to represent a particular bursting pressure, each additional member of said series having a different spacing of apertures, respectively representing different bursting pressures, at least three positioning pins carried by two mating sections of a pressure release conduit, the number and placement of the positioning pins conforming to the number and placement of the apertures, whereby said pins will receive only a particular diaphragm as controlled by said apertures therein, and designed to rupture only at a particular pressure, and securing the so-fitted diaphragm between said mating sections.

References Cited in the file of this patent

UNITED STATES PATENTS

| | | |
|---|---|---|
| 1,030,456 | Broadhurst | June 25, 1912 |
| 1,446,585 | Riotte | Feb. 27, 1923 |
| 2,095,828 | Nerad | Oct. 12, 1937 |
| 2,123,662 | Raymond | July 12, 1938 |
| 2,224,748 | Sauer | Dec. 10, 1940 |
| 2,291,360 | Unger | July 28, 1942 |
| 2,419,826 | Dodelin et al. | Apr. 20, 1947 |
| 2,476,748 | MacGregor | July 19, 1949 |
| 2,505,456 | Beecher | Apr. 25, 1950 |